(12) United States Patent
Jensen et al.

(10) Patent No.: US 9,932,009 B2
(45) Date of Patent: Apr. 3, 2018

(54) BRACKET FOR FRONT CRASH SENSOR

(71) Applicant: Ford Global Technologies, LLC, Dearborn, MI (US)

(72) Inventors: John W. Jensen, Canton, MI (US); Jason Shomsky, Brownstown, MI (US); David James Bauch, South Lyon, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/145,980

(22) Filed: May 4, 2016

(65) Prior Publication Data
US 2017/0320456 A1 Nov. 9, 2017

(51) Int. Cl.
*B60R 19/48* (2006.01)
*B62D 25/08* (2006.01)

(52) U.S. Cl.
CPC .......... *B60R 19/483* (2013.01); *B62D 25/085* (2013.01)

(58) Field of Classification Search
CPC .......................... B60R 19/483; B62D 25/085
USPC .............................. 296/193.1, 187.09, 193.11
See application file for complete search history.

(56) References Cited

U.S. PATENT DOCUMENTS

| | | | | |
|---|---|---|---|---|
| 5,311,963 A * | 5/1994 | Shigeoka | ............ | B60R 21/0132 180/274 |
| 5,326,133 A * | 7/1994 | Breed | ................... | B60R 19/483 180/274 |
| 6,557,889 B2 * | 5/2003 | Breed | ...................... | B60J 10/00 280/735 |
| 6,729,429 B2 * | 5/2004 | Takahashi | ............ | B60R 19/483 180/271 |
| 7,137,472 B2 * | 11/2006 | Aoki | ................... | B60R 21/0136 180/274 |
| 7,635,043 B2 * | 12/2009 | Breed | ...................... | B60J 10/00 180/282 |
| 8,491,039 B2 * | 7/2013 | Mikutsu | .................. | B60R 19/48 180/274 |
| 9,004,578 B1 | 4/2015 | Ghannam et al. | | |
| 2007/0200692 A1 * | 8/2007 | Kamel | ...................... | G01L 1/16 340/436 |
| 2011/0037292 A1 * | 2/2011 | Owen | .................. | B62D 25/084 296/193.09 |

FOREIGN PATENT DOCUMENTS

EP 1646534 A1 4/2006

* cited by examiner

*Primary Examiner* — Jason S Morrow
*Assistant Examiner* — E Turner Hicks
(74) *Attorney, Agent, or Firm* — Jason Rogers; Brooks Kushman

(57) ABSTRACT

A front end structure is provided for a vehicle that includes a bracket for attaching front crash sensors to the vehicle. The front end structure includes an engine compartment and a hood connected to the engine compartment by a hood latch and a pair of hinges. The bracket is connected to the hood latch and the front crash sensors to maintain palpability with the vehicle through the hood in a collision.

20 Claims, 2 Drawing Sheets

BRACKET FOR FRONT CRASH SENSOR

TECHNICAL FIELD

This disclosure relates to a bracket for securing front crash sensors to a hood latch of a vehicle.

BACKGROUND

Vehicles are being designed to include high strength, low elongation materials such as carbon fiber reinforced polymers, polypropylene, magnesium, ceramics, and the like. For example, grille opening reinforcements made of carbon fiber reinforced polymers are strong and lightweight but are brittle and tend to shatter or disintegrate in a high energy collision.

Safety restraint performance depends upon peripheral sensors such as front crash sensors. Crash discrimination capabilities of front crash sensors depend, in part, upon the physical properties of the mounting structure and the location of the front crash sensors. The mounting structure should be ductile, deformable, strong and elastic so that the front crash sensors follow overall vehicle deceleration profiles during high energy impacts.

The grille opening reinforcement is located in a vehicle close to the front end but recessed behind the bumper. Locating the front crash sensors in this location enhances control of safety restraints that are controlled by a restraints control module located inside the passenger compartment. Spacing the front crash sensors relative to other crash sensors facilitates analysis of the sensor signals and distinguishing different types of collision scenarios. Providing two front crash sensors symmetrically on the vehicle facilitates distinguishing, for example, a full frontal collision from an offset collision, or a side impact collision.

Front crash sensors cannot be effectively attached to a brittle grille opening reinforcement because the sensors may become free-floating when the grille opening reinforcement disintegrates. Free-floating front crash sensors with single axis accelerometer sensors are unable to provide useful crash data to the restraints control module and may become electrically disconnected from the restraints control module.

In one approach, a bracket, commonly referred to as a "boomerang bracket," is attached in front of the grille opening reinforcement and attached to the frame rails in the front end of the vehicle. With this approach, the front crash sensors were located in a less than optimal location that is too low for low riding vehicles colliding with higher ground clearance vehicle. The boomerang bracket approach also increases the complexity of the front end assembly process, increases weight and may reduce sensor effectiveness.

In another approach, five steel parts are joined by a composite material overlay and connected to the frame rails and the "shotgun" (fender wall support). Problems with this type of structure are that the part is complex and is difficult to install on the vehicle. These problems increase part cost, labor costs and add weight to the vehicle.

The above problems and other problems are addressed by this disclosure as summarized below.

SUMMARY

According to one aspect of this disclosure, a sensor bracket is disclosed for a vehicle that has a grille opening reinforcement, a hood and a hood latch. The sensor bracket comprises a metal band attached to the hood latch that extends transversely across the grille opening reinforcement. The sensor bracket includes a first front crash sensor attached to a right end of the band and a second front crash sensor attached to a left end of the band.

According to other aspects of this disclosure, the vehicle may include a pair of longitudinal frame rails and a pair of fender wall supports with a sensor bracket arranged so that the right and left ends of the band are spaced from the longitudinal frame rails and the fender wall supports. The band may be attached to the grille opening reinforcement with the right end of the band and the left end of the band not being coextensive with a width of the grille opening reinforcement so that the grille opening reinforcement spans the space between the band and the frame rails or the fender wall supports.

The grille opening reinforcement may be formed from a material selected from the group of materials including carbon fiber reinforced plastic, polypropylene, ceramic, and magnesium.

The band, also referred to herein as a bracket, may be formed from a material selected from the group including steel, stainless steel, spring steel, and aluminum.

The grille opening reinforcement may include an inner panel and an outer panel, and the band may be internally secured between the inner panel and the outer panel.

The first and second front crash sensors may be disposed on the band in locations that are symmetrical relative to the hood latch.

The band may be attached to the grille opening reinforcement above an airflow opening defined by the grille opening reinforcement and below the hood.

The band may be configured to be attached to the hood latch in the center of the band that is configured to receive the hood striker.

According to another aspect of this disclosure, a front end structure is provided for a vehicle. The front end structure includes an engine compartment and a hood connected to the engine compartment by a hood latch and a pair of hinges. A bracket is connected to the hood latch. A pair of front crash sensors is attached to the bracket. Connection of the bracket to the hood latch and both of the front crash sensors is required to maintain palpability with the vehicle through the hood in a collision.

According to additional aspects of this disclosure, a restraints control module is operatively connected to the front crash sensors to receive data in the collision. The bracket may be connected to a grille opening reinforcement and the hood latch during normal operation of the vehicle, but the bracket is configured to remain connected to the hood latch in a collision that destroys the grille opening reinforcement.

The above aspects of this disclosure and other aspects will be described in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
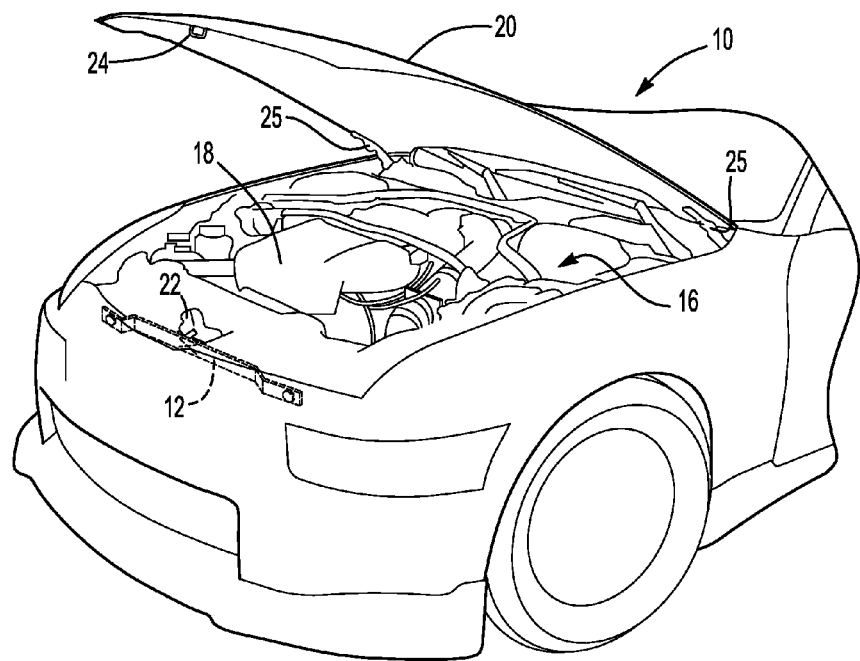
FIG. 1 is a fragmentary perspective view of a vehicle including the sensor bracket for supporting two front crash sensors installed on the vehicle.

Referring to FIG. 1, a vehicle 10 is shown that includes a sensor bracket 12 disposed in front of an engine compartment 16 that houses an engine 18. The sensor bracket 12 is formed from a material such as steel, stainless steel, spring steel, or aluminum. While in the illustrated embodiment an engine 18 is provided, it should also be understood that this disclosure is equally applicable to hybrid vehicles having electric traction motors. The engine compartment 16 is covered by a hood 20 that is secured to the vehicle by a hood latch 22. The sensor bracket 12 is connected to the hood latch 22. A striker 24 is provided on the hood 20 that is received by the hood latch 22 and secures the hood in conjunction with a pair of hood hinges 25 when the hood 20 is closed. The sensor bracket 12 maintains palpability with the vehicle 10 in a collision because the hood 20 is connected by the hood latch 22 and the hood hinges 25.

Figure 2:
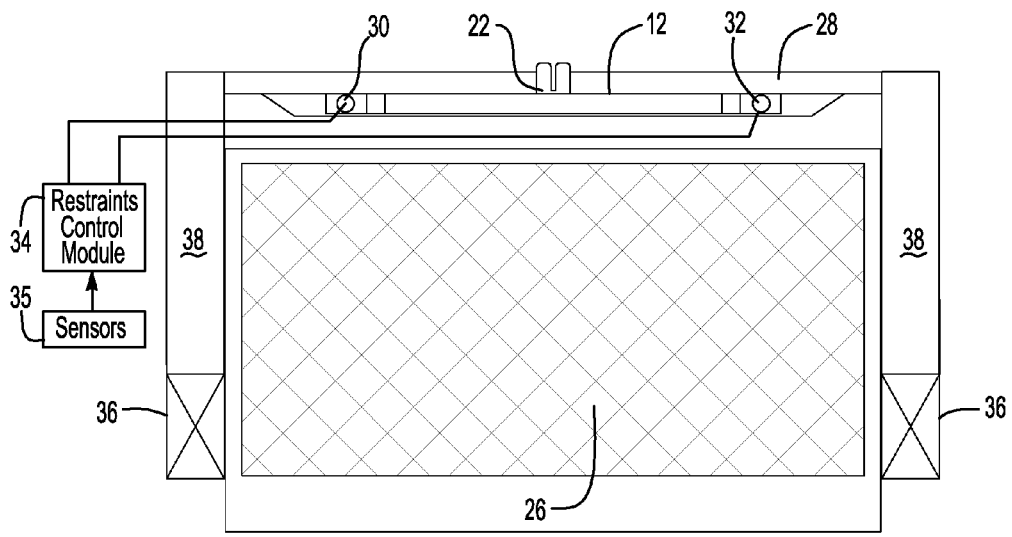
FIG. 2 is a front elevation view of a grille opening reinforcement and the sensor bracket for supporting two front crash sensors.

Referring to FIG. 2, a grille opening 26, or airflow opening, is shown that includes a grille opening reinforcement 28. The grille opening reinforcement 28 may be formed from a variety of materials, but for the purposes of reducing the mass of the vehicle, the grille opening reinforcement may be made of a carbon fiber reinforced plastic, polypropylene, ceramic, or magnesium. The grille opening reinforcement 28 spans the top of the grille opening 26 in the illustrated embodiment, but it should be understood that the grille opening reinforcement 28 may also extend downwardly on both sides of the grille opening 26.

A first front crash sensor 30 and a second front crash sensor 32 are attached to opposite ends of the sensor bracket 12. The first and second front crash sensors 30 and 32 are attached to the sensor bracket 12 that is attached to the grille opening reinforcement 28. The front crash sensors 30 and 32 are connected to a restraints control module 34 that controls actuation of vehicle restraints such as air bags. Other sensors 35 also provide data to the restraints control module 34 that are integrated with data from the front cash sensors 30 and 32. The first and second front crash sensors 30 and 32 are not connected to and are spaced from the frame rails 36 and fender support rails 38.

Figure 3:
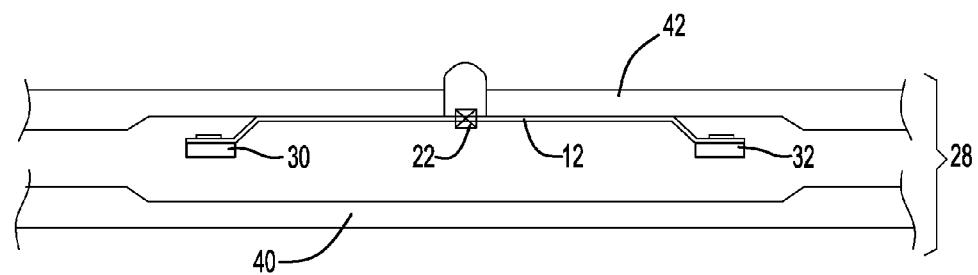
FIG. 3 is an exploded top plan view of the two-part grille opening reinforcement showing the sensor bracket for supporting two front crash sensors.

Referring to FIG. 3, the grille opening reinforcement 28 is shown to include a front part 40 and a back part 42 that are secured together in a generally cam-shell arrangement in the illustrated embodiment. The front part 40 and back part 42 enclose the sensor bracket 12 and first and second front crash sensors 30 and 32. The sensor bracket 12 is attached to the hood latch 22 that is used to secure the hood 20 to the vehicle 10 (as shown in FIG. 1). The grille opening reinforcement 28 encloses and protects the first and second front crash sensors 30 and 32 under normal operating conditions. The first and second front crash sensors 30 and 32 are held by the sensor bracket 12 in a desirable location above the grille opening reinforcement 28 to be functional in a collision in the event the vehicle 10 under-rides another vehicle.

Figure 4:
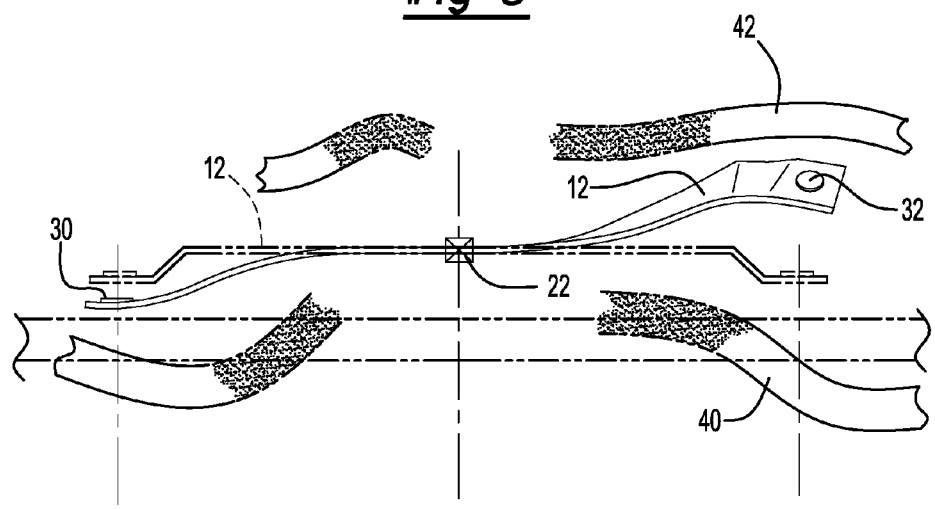
FIG. 4 is a fragmentary top plan view showing the sensor bracket and front crash sensors after a collision.

Referring to FIG. 4, a diagrammatic illustration is provided of the sensor bracket 12 and first and second front crash sensors 30 and 32 after a collision. It should be understood that a collision may cause many different types of impacts and that FIG. 4 only represents one example of the result of a collision with the front of the vehicle 10. The drawing of the sensor bracket 12 in phantom lines shows the initial or normal position of the bracket 12. The bracket 12 shown in solid lines is indicated to be representative of the sensor bracket 12 after a front end collision. The grille opening reinforcement 28 is made of a brittle composite material that may be separated from the sensor bracket 12 and disintegrate as a result of the force of a front end collision.

The sensor bracket 12 is configured to remain intact and attached to the hood latch 22. As a result of the attachment to the vehicle 10 through the hood latch 22 and the pair of hood hinges 25, the front crash sensors 30 and 32 maintain palpability with the vehicle and can provide useful data to a restraints control module 34 in a front end collision.

The restraints control module 34 is preferably disposed in the passenger compartment of the vehicle 10 for protection of the restraints control module 34. The front crash sensors 30 and 32 are electrically connected to the restraints control module 34. If the front crash sensors 30 and 32 were to be secured to the grille opening reinforcement 28 made of a brittle material, such as a carbon fiber reinforced plastic composite, data from the front crash sensors would tend to be unreliable because of the potential for the front crash sensors 30 and 32 to become separated from the vehicle if the grille opening reinforcement 28 disintegrates.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A sensor bracket for a vehicle having an engine compartment defining an airflow opening below a grille opening reinforcement, a hood and a hood latch, the sensor bracket comprising:
   a band attached to the hood latch and being housed within the grille opening reinforcement and above the airflow opening; and
   first and second front crash sensors attached to right and left ends of the band, respectively.

2. The sensor bracket of claim 1 wherein the vehicle includes a pair of longitudinal frame rails and a pair of fender wall supports, and wherein the right end and left end of the band are spaced from the pair of longitudinal frame rails and the pair of fender wall supports.

3. The sensor bracket of claim 2 wherein the band is attached to the grille opening reinforcement with the right end of the band and the left end of the band not being coextensive with a width of the grille opening reinforcement and the grille opening reinforcement spans a space between the band and the frame rails.

4. The sensor bracket of claim 2 wherein the band is attached to the grille opening reinforcement with the right end of the band and the left end of the band not being coextensive with a width of the grille opening reinforcement and the grille opening reinforcement spans a space between the band and the fender wall supports.

5. The sensor bracket of claim 1 wherein the grille opening reinforcement is formed from a material selected from the group consisting of:
   carbon fiber reinforced plastic;
   polypropylene;
   ceramic; and
   magnesium.

6. The sensor bracket of claim 1 wherein the band is formed from a material selected from the group consisting of:
   steel;
   stainless steel;
   spring steel; and
   aluminum.

7. The sensor bracket of claim 1 wherein the grille opening reinforcement includes an inner panel and an outer panel, and wherein the band is internally secured between the inner panel and the outer panel.

8. The sensor bracket of claim 1 wherein the first and second front crash sensors are disposed on the band in locations that are symmetrical relative to the hood latch.

9. The sensor bracket of claim 1 wherein the band is attached to the grille opening reinforcement above an airflow opening defined by the grille opening reinforcement and below the hood.

10. The sensor bracket of claim 1 wherein the band is configured to be attached to the hood latch in the center of the band for receiving the hood striker.

11. A front-end structure for a vehicle comprising:
    an engine compartment defining an airflow opening;
    a hood connected to the engine compartment by a hood latch and a pair of hinges;
    a bracket connected to the hood latch above the airflow opening; and
    a pair of front crash sensors attached to the bracket at laterally symmetrical locations, the sensors maintaining palpability with the vehicle through the hood in a collision.

12. The front-end structure of claim 11 further comprising:
    a restraints control module operatively connected to the front crash sensors to receive data in the collision.

13. The front-end structure of claim 11 further comprising:
    a pair of longitudinal frame rails and a pair of fender wall supports, and wherein right left ends of the bracket are spaced from the pair of longitudinal frame rails and the pair of fender wall supports.

14. The front-end structure of claim 11 wherein the bracket is connected to a grille opening reinforcement and the hood latch during normal operation of the vehicle, and wherein the bracket remains connected to the hood latch in a collision that destroys the grille opening reinforcement.

15. The front-end structure of claim 14 wherein the bracket is attached to the grille opening reinforcement with the right and left ends of the bracket not being coextensive with a width of the grille opening reinforcement, and wherein the grille opening reinforcement spans a space between the bracket and the frame rails.

16. The front-end structure of claim 14 wherein the bracket is attached to the grille opening reinforcement with the right and left ends of the bracket not being coextensive with a width of the grille opening reinforcement, and wherein the grille opening reinforcement spans a space between the bracket and the fender wall supports.

17. The front-end structure of claim 14 wherein the grille opening reinforcement includes an inner panel and an outer panel, and wherein the bracket is internally secured between the inner panel and the outer panel.

18. The front-end structure of claim 11 wherein the pair of front crash sensors are disposed on the bracket in locations that are symmetrical relative to the hood latch.

19. The front-end structure of claim 11 wherein the bracket is attached to a grille opening reinforcement above the airflow opening defined by the grille opening reinforcement.

20. The front-end structure of claim 11 wherein the bracket is configured to be attached to the hood latch disposed in the center of the bracket and is adapted to receive the hood striker.

* * * * *